UNITED STATES PATENT OFFICE.

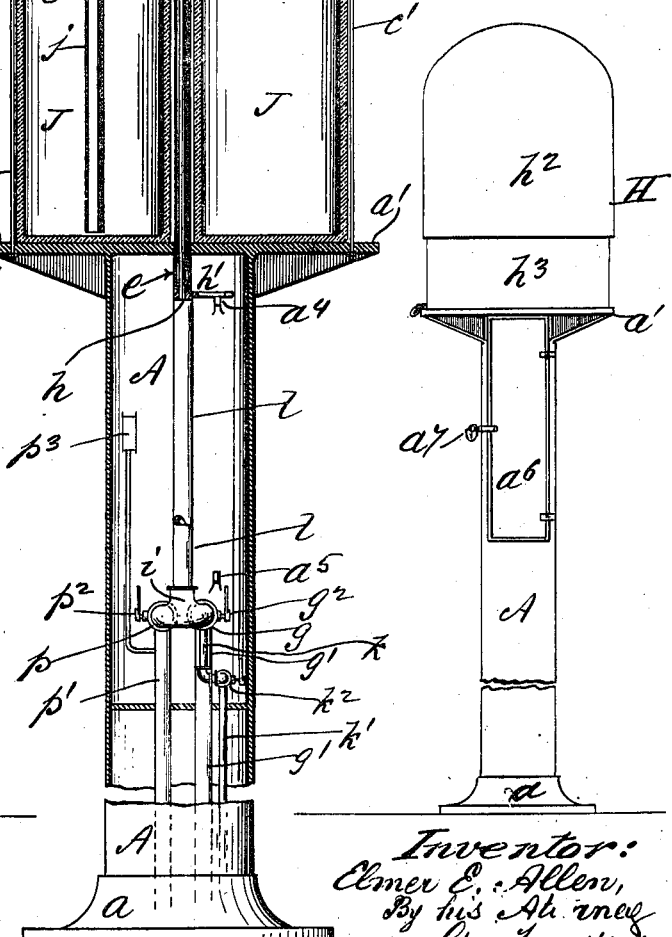

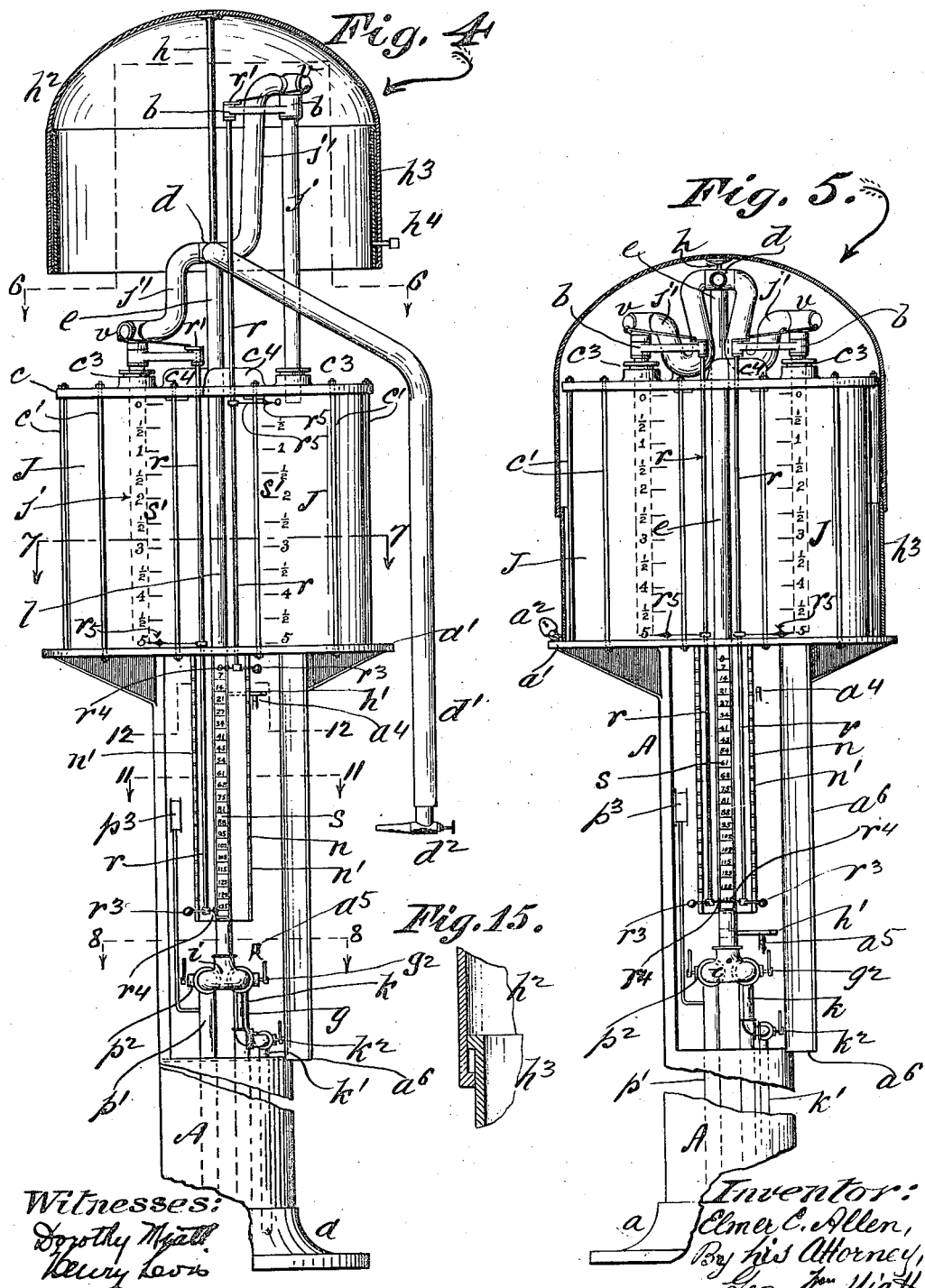

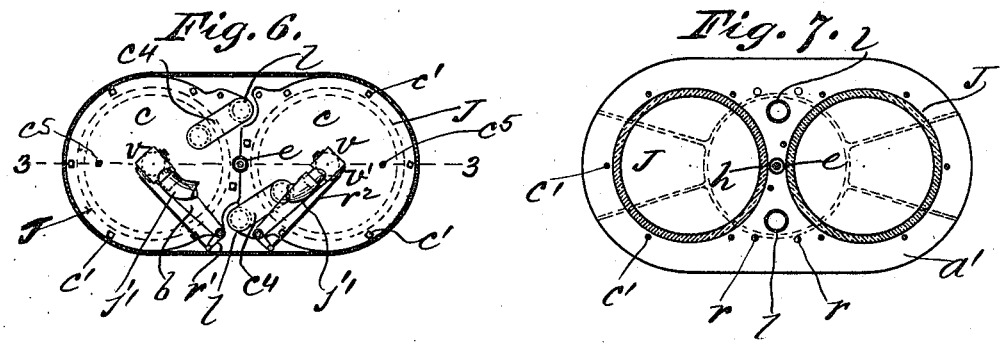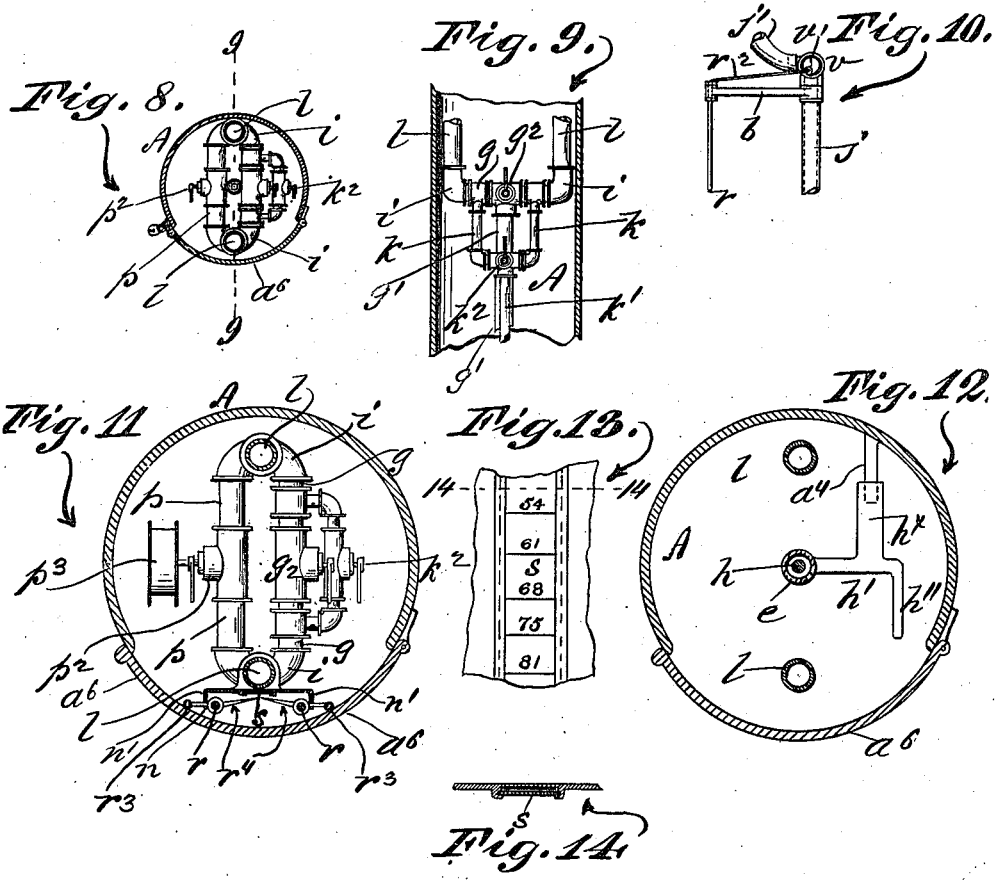

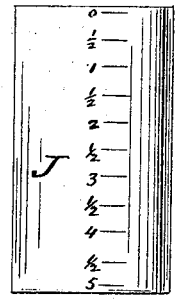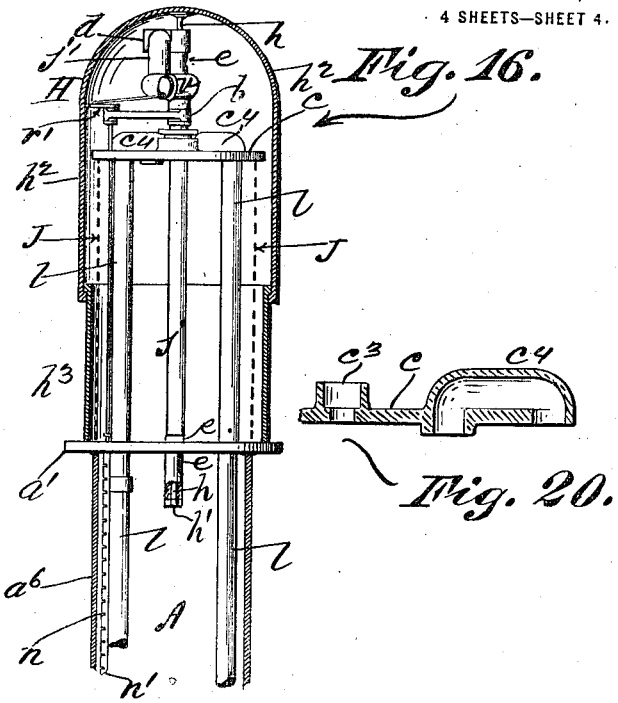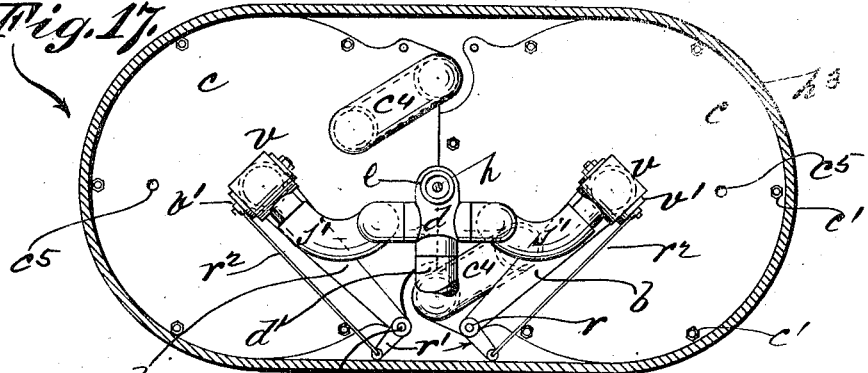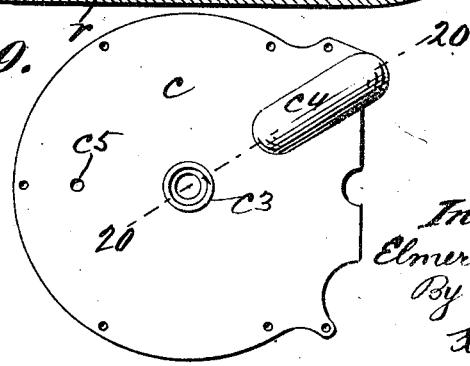

ELMER ELSWORTH ALLEN, OF FLUSHING, NEW YORK.

LIQUID-DISPENSER.

1,296,351.  Specification of Letters Patent.  Patented Mar. 4, 1919.

Application filed May 28, 1918. Serial No. 236,934.

*To all whom it may concern:*

Be it known that I, ELMER E. ALLEN, a citizen of the United States, and a resident of Flushing, county of Queens, and State of New York, have invented certain new and useful Improvements in Liquid-Dispensers, of which the following is a specification.

While applicable to the measuring and dispensing of various liquids my invention is designed more particularly for embodiment in apparatus for vending gasolene for use in automobiles, etc., and is so exemplified herein.

The objects are to reduce manual manipulation to a minimum and render the apparatus substantially automatic in function; to prevent waste and inaccuracy in measurement and insure full delivery of the quantity of gasolene purchased; to visualize the quantity of gasolene to be delivered and automatically indicate the price of the liquid thus measured; and to facilitate measuring and expedite delivery by a duplication of parts whereby the apparatus may be used in a practically continuous manner in that one section may be employed in receiving and measuring liquid while measured liquid is being discharged from the other section, all as hereinafter fully set forth.

In the accompanying drawings,

Figure 1, is a front elevation on a relatively small scale of my improved dispensing apparatus, showing the hood raised;
Fig. 2, is a similar view of the apparatus contracted and closed, as when not desired for use;

Fig. 3, is a central vertical sectional elevation upon a larger scale, taken upon plane of line 3—3, Fig. 6, showing the hood raised;

Fig. 4, is a front elevation of the apparatus partly broken away, showing the hood raised, telescoped, and in section;

Fig. 5, is a similar view with the hood etc., lowered;

Fig. 6, is a horizontal section taken upon plane of line 6—6, Fig. 4, except that in the latter figure the lower part of the hood is raised;
Fig. 7, is a horizontal section taken upon plane of line 7—7, Fig. 4;

Fig. 8, is a horizontal section taken upon plane of line 8—8, Fig. 4;

Fig. 9, is a vertical section of the hollow standard taken upon plane of line 9—9, Fig. 8, showing the adjacent contained parts in elevation;

Fig. 10, is a detail view of the valve actuating means employed for controlling the flow of gasolene to the measuring jars;

Fig. 11, is a horizontal section upon an enlarged scale taken upon plane of line 11—11, Fig. 4, showing the door closed;

Fig. 12, is a similar section taken upon plane of line 12—12, Fig. 4, with the door closed;

Fig. 13, is a detail view of the price scale;

Fig. 14 is a section taken upon plane of line 14—14, Fig. 13;

Fig. 15, is a detail in section of the overlapping edges of the hood members;

Fig. 16, is a section of the hood and upper part of the hollow standard, the position of the measuring jar being dotted, the bolt rods omitted, and the other parts shown in elevation;

Fig. 17, is a view similar to Fig. 6, but upon a larger scale, and showing more clearly the cross head and flexible connections;

Fig. 18, is an elevation of one of the measuring jars;

Fig. 19, is a top view of one of the cap plates;

Fig. 20, is a sectional detail upon plane of line 20—20, Fig. 19.

A, is a hollow standard or pedestal furnishing support for the other parts, being provided with a flanged base $a$, adapted to be bolted or otherwise permanently secured in position. The upper portion of the pedestal A, is in the form of a table $a'$, on which are seated the twin measuring compartments J, J, preferably made of glass and cylindrical in form. In fact I prefer to use cylindrical glass jars, each made in one piece with its bottom, as shown in Figs. 3 and 18. Resting upon the tops of these jars J, J, are the cap plates $c$, $c$, clamped thereto by screw bolts $c'$, $c'$, passing through said cap plate and through the table $a'$, as shown particularly in Fig. 3. Gaskets $c^2$, $c^2$, (Fig. 3) are interposed between the upper edges of the measuring jars J, J, and the cap plates $c$, to seal said edges of the jars.

Each measuring jar J, J, is provided with a vertically slidable delivery pipe $j$, $j$, passing through suitable packing boxes $c^3$, $c^3$, on the cap plates c. The upper ends of these delivery pipes j, j, communicate through flexible connections j', j', with a common discharge T d, (see particularly Fig. 17) to which the discharge hose d', is coupled.—said discharge hose d', being provided with the usual nozzle $d^2$, (Fig. 4) for insertion in the inlet to an auto-tank or the like. The discharge T d, is secured to the upper portion of a vertically movable and centrally positioned carrier tube e, the lower end of which latter rests upon a lateral arm h', secured to the lower extremity of the hood-supporting rod h, which extends upward axially through said carrier tube e, as shown in Fig. 3,—the upper end of said supporting rod h, being attached to the dome section $h^2$, of the hood H, consisting of said dome section $h^2$, and of the lower telescopic section $h^3$, fitting slidably therein. The telescopic section $h^3$, of the hood H, is held against separation from the hood section $h^2$, by interlocking flange connection, as shown in Figs. 15 and 16, or by any other mechanical expedient,—the telescoping of the hood H, being provided for so that the hood H, may be made to assume either of the three positions shown in Figs. 3, 4 and 5. Thus in Fig. 3, the hood is raised and extended to its full extent to accommodate and inclose the operative parts situated above the cap plates c; in Fig. 4, the hood is extended with the dome section $h^2$, in the same elevated position as in Fig. 3, but the telescopic section $h^3$, is shown as raised (held so by a pin or the equivalent $h^4$) to give access and visuality to said parts above the cap plates c; while in Fig. 5, all the operative parts above the table a', are shown as lowered, with the telescopic section $h^3$, resting on said table a', in which closed position and relationship the telescopic section $h^3$, may be secured to the table a', by a padlock $a^2$, or similar device that will thus insure the isolation and protection of the parts above the table a', until desired for use and observation.

The hood H, discharge T d, and flexible connections j', j', are sustained in the raised or lowered positions described by means of stationary rests $a^4$, $a^5$, within the standard A, preferably consisting of bracket arms $a^4$, $a^5$, rigidly protuberant from the inner side of said standard, as shown in Figs. 3, 4, 5 and 12, by reference particularly to which latter it will be seen that a slight turn of the lateral arm h', by means of its handle h'', will be sufficient to connect or disconnect its bearing tongue $h^x$, with or from the supporting stop $a^4$, or $a^5$, as the case may be.

Each measuring jar J, is provided with its own lead pipe l, communicating therewith through an elbow $c^4$, formed directly in its cap plate c, as shown in detail in Fig. 20. Each lead pipe l, is fixed in position and extends down between and through the cap plates c, and through the table a', to its own T i, which communicates on one side with the air pressure pipe p, and on the other with the gasolene pipe g,—the air pressure pipe p, being connected by a supply pipe p', with a suitable source of air pressure, while the gasolene pipe g, is in like manner connected by a supply pipe g', with a gasolene tank or other source of gasolene supply. A two way cock $p^2$, is interposed in the air pressure pipe p, and between it and the air pressure pipe p', so that air may be supplied to the leaders l, l, alternately, or be shut off from both; and in like manner a two way cock $g^2$, interposed in the gasolene pipe g, and between it and the gasolene supply pipe g', admits of the supply of gasolene to the leaders l, l, alternately, or of the shutting off of the supply of gasolene from both leaders l, l.

Branch drain pipes k, k, connect with the gasolene pipe g, one on either side of the two-way cock $g^2$, and connect with a common drain pipe k', through the medium of a two-way cock $k^2$, as will be seen more particularly by reference to Figs. 9 and 11. $p^3$, is a pressure gage, connected with the air pressure pipe p', and observable when the door $a^6$, of the hollow standard A, is open. Said door $a^6$, is provided with a padlock $a^7$, or other means of securing it in closed position to protect and inclose the valves, etc., when the apparatus is not in use.

As hereinbefore intimated the delivery pipes j, j, protrude through packing boxes $c^3$, $c^3$, in the cap plates c, c, and their upper extremities communicate through flexible connections j', j', with the common discharge T d. It is obvious that the position of the lower end of each of the delivery pipes j, as related to the bottom of its jar will determine the amount of gasolene to be withdrawn therefrom, since when the liquid level falls below the lower end of the delivery pipe the flow therethrough will cease. Hence, I make my delivery pipes j, adjustable vertically, and this I prefer to accomplish by means of setting rods r, r, pivotally connected with and suspended upon bracket arms b, b, which are secured to the upper portions of said delivery pipes j, below and adjacent to the valves v, which valves v, are attached to the upper extremities of said delivery pipes, being interposed between the latter and the aforesaid flexible connections j', which communicate through the discharge T d, with the discharge hose d'. The upper end of each setting rod r, is journaled in the outer end of its bracket b, and is provided with a crank arm r', which is pivotally connected by a rod $r^2$, with the stem v', of the valve b, on the upper end of the delivery pipe,—the connection of the rod $r^2$, with the valve stem v', being eccentric as related to the axis of the latter, so that the partial turning of the setting rod $r$, will actuate the valve $v$, as will be understood more particularly by reference to Figs. 4, 16 and 17.

The lower extremity of each setting rod $r$, is formed with a handle $r^3$, the shank of which is adapted to fit into any of a series of notches $n$, $n$, formed for the purpose in a rack $n'$, fixedly positioned in the standard A, below its table $a'$, and adjacent to the lower portion of the setter rod $r$, as shown in Figs. 4, 5, 11 and 16. Each setter rod $r$, also is provided with a pointer $r^4$, which indicates on the adjacent scale $s$, the price of the quantity of gasolene to which the setter rod $r$, is set to effect discharge through its delivery pipe $j$,—said price scale $s$, being positioned between the two racks $n'$, $n'$, as shown in Figs. 4, 5 and 11. Each setter rod $r$, also carries a pointer $r^5$, arranged to indicate the quantity of gasolene prescribed for delivery by the position of the setter rod $r$, and its delivery pipe $j$,—the quantity scales $s'$, in this case being preferably imposed directly on the measuring jars J, J, as shown in Figs. 4 and 5. In the drawings the jars J, and scales $s$, $s'$, are shown as arranged for a limit of five gallon liquid measurement, although this of course is not a material point, as the capacity of the apparatus may be varied without departing from the spirit and intent of the invention.

As will be seen by reference to Figs. 17 and 19, the cap plates are duplicates of each other, and interchangeable; and a broken or defective jar can be readily removed and another substituted in lieu thereof without disturbing the other jar. $c^5$, are vent holes in the cap plates to facilitate the flow of liquid in the jars.

It will be noted that when the movable parts are lowered, as in Fig. 5, and the hood H, and door $a^6$, closed and locked as in Fig. 2, all the operative parts are inclosed and protected from contact with extraneous objects, surreptitious manipulation, dust, etc.

The apparatus being closed and locked as in Fig. 1, when it is desired for use, the locks $a^2$ and $a^7$, are released, the door $a^6$ opened, and the rod $r$, and carrier tube $e$, raised by means of the handle $h''$, (Fig. 12) into the position shown in Fig. 3,—the lateral arm $h'$, being then turned until its bearing tongue $h^x$, rests upon the stationary seat $a^4$, as in Figs. 3, 4 and 12, thereby sustaining said rod $n$, and carrier tube $e$, in elevated position. The raising of the rod $r$, elevates and extends the hood H, and simultaneously the raising of the carrier tube $e$, elevates the discharge T $d$, into the position shown in Fig. 4. The telescopic section $h^3$, of the hood H, may now be raised into the dome section $h^2$, as shown in said Fig. 4, so as to afford access visually and actually when required to the operative parts above the cap plate $c$, and also to allow of the extension outward of the discharge hose $d$.

Gasolene may now be admitted to either or both of the measuring jars J, J, one at a time, through the medium of the two way cock $g^2$, the jars being filled to their full capacity of five gallons each, and any excess being recovered through the medium of the drain pipes $k$, $k$, $k'$, and valve $k^2$. Either one of the setting rods $r$, may now be raised or lowered by means of its handle $r^3$, to bring the lower end of the discharge pipe $j$, with which it is connected, to the desired level in its measuring jar J, so as to prescribe the quantity of gasolene to be withdrawn therefrom. Thus if the full five gallons is required for delivery the rod $r$, is lowered until the pointer $r^5$, is level with the gage mark "5"; bringing the lower end of the discharge pipe $j$, to the bottom of the measuring jar J, as shown in the left jar J, in Figs. 3 and 4. If a less quantity of gasolene is to be dispensed, the rod $r$, and discharge pipe $j$, are set accordingly, as said discharge pipe being obviously only able to draw off the gasolene in the jar J, down to and not below its lower or inlet end of said discharge pipe $j$. Thus if the index $r^5$, and discharge pipe $j$, are set for, say, $2\frac{1}{2}$ on scale $s'$, only $2\frac{1}{2}$ gallons of gasolene can be withdrawn from the jar.

When the setting rod $r$, is raised or lowered to the required degree its handle $r^3$, is turned to bring the shank thereof into the opposed notch $n$, in the adjacent rack $n'$, thereby locking the rod $r$, and discharge pipe $j$, in the prescribed position, and at the same time, by means of the crank $r'$, and connection rod $r^2$, turning the valve stem $v'$, of the valve $v$, in such manner as to open communication between the said discharge pipe $j$, and its flexible connection $j'$, so that the latter can deliver the liquid through the discharge T $d$, to the discharge tube $d'$,—the liquid being withdrawn from the jar J, by siphonic act which is superinduced by temporarily admitting air pressure to the top of the jar J, through its leader $l$, by means of the valve $p^2$, the latter being closed as soon as the flow of liquid beyond the discharge T $d$, is assured.

The setting of the rod $r$, pointer $r^5$, and discharge pipe $j$, to measure and prescribe the amount of gasolene to be withdrawn from the measuring jar J, also causes the pointer $r^4$, to automatically indicate on the scale $s$, the price of the quantity dispensed.

By my apparatus manual pumping may be dispensed with since the gasoline may be automatically supplied to the measuring jars J, J, under suitable head by well known means through the supply pipe $g'$; while the high siphonic discharge from said measuring jars J, J, insures the complete delivery therefrom of the quantity prescribed, thus guarding against shortage of measure, which is furthermore prevented by the visual liquid level displayed by the glass measuring jars J, J, themselves.

The use of twin measuring jars J, J, and their appurtenances insures quick service and obviates delays, since one jar may be filled while the other is being emptied,—at the same time the customers have visual evidence of the cost and quantity of all purchases. Furthermore, the siphoning of the discharge from a relatively high level facilitates service to all makes and sizes of vehicles.

While my improvements are designed primarily for duplex measuring apparatus there are certain features of novelty that may be embodied in a single measuring jar device.

What I claim as my invention and desire to secure by Letters Patent is,

1. In liquid dispensing apparatus of the character designated, in combination, a measuring jar, means for supplying liquid thereto, a vertically-slidable discharge pipe projecting into said measuring jar, a discharge hose connected with said discharge pipe, a vertically-movable hood into which said discharge pipe extends, and means for introducing air pressure into said measuring jar to superinduce discharge of liquid from said measuring jar, for the purpose described.

2. In liquid dispensing apparatus of the character designated, in combination, a measuring jar, means for supplying liquid thereto, a vertically adjustable discharge pipe projecting into said measuring jar, a vertically-movable hood, means for raising said hood and setting said discharge pipe at prescribed heights as related to said measuring jar, a discharge hose connected with said discharge pipe, and means for introducing air pressure into said measuring jar to superinduce discharge of liquid from said measuring jar, for the purpose described.

3. In liquid dispensing apparatus of the character designated, in combination, a measuring jar, means for supplying liquid thereto, a vertically adjustable discharge pipe projecting into said measuring jar, a vertically adjustable discharge hose coupling connected with said jar discharge pipe by means of a flexible connection, means for raising and lowering said discharge hose coupling, means for setting said discharge pipe at prescribed heights as related to the measuring jar, a discharge hose connected with said adjustable hose coupling, and means for introducing air pressure into said measuring jar to superinduce discharge of the liquid from said measuring jar, for the purpose described.

4. In liquid dispensing apparatus of the character designated, in combination, a measuring jar, means for supplying liquid thereto, a vertically adjustable discharge pipe projecting into said measuring jar and provided with a valve at its upper extremity, a vertically-adjustable setter rod, a bracket arm attached to said discharge pipe and to said setter rod, said setter rod mounted by means which adapt it to be turned axially, a crank arm on the upper end of said setter rod, a rod pivotally connected to said crank arm and to the stem of said valve on the discharge pipe, a discharge hose coupling, a flexible connection between said valve and said discharge hose coupling, means for adjusting said coupling vertically, a discharge hose attached to said coupling, means in conjunction with said setter rod for positioning said discharge pipe at prescribed heights as related to the measuring jar, and means for introducing air pressure into said measuring jar to superinduce discharge of the liquid from said measuring jar, for the purpose described.

5. In liquid dispensing apparatus of the character designated, in combination, a measuring jar, means for supplying liquid thereto, a vertically adjustable discharge pipe projecting into said measuring jar and provided with a valve at its upper extremity, a vertically adjustable setter rod, a bracket arm attached to said discharge pipe and to said setter rod, said setter rod mounted by means which adapt it to be turned axially, a crank arm on the upper end of said setter rod, a rod pivotally connected to said crank arm and to the stem of said valve on the discharge pipe, a discharge hose coupling, a flexible connection between said valve and said discharge hose coupling, means for adjusting said coupling vertically, a discharge hose attached to said coupling, means in conjunction with said setter rod for positioning said discharge pipe at prescribed heights as related to the measuring jar, a fixed price scale positioned adjacent to said setter rod, and a pointer on said setter rod arranged to indicate on said scale the price of the quantity of liquid dispensed, and means for introducing air pressure into said measuring jar to superinduce discharge of the liquid from said measuring jar, for the purpose described.

6. In liquid dispensing apparatus of the character designated, in combination, a measuring jar, means for supplying liquid thereto, a vertically adjustable discharge pipe projecting into said measuring jar and provided with a valve at its upper extremity, a vertically-adjustable setter rod, a bracket arm attached to said discharge pipe and to said setter rod, said setter rod mounted by means which adapt it to be turned axially, a crank arm on the upper end of said setter rod, a rod pivotally connected to said crank arm and to the stem of said valve on the discharge pipe, a discharge hose coupling, a flexible connection between said valve and said discharge hose coupling, means for adjusting said coupling vertically, a discharge hose attached to said coupling, means in conjunction with said setter rod for positioning said discharge pipe at prescribed heights as related to the measuring jar, a fixed measuring scale positioned adjacent to said setter rod and a pointer on said setter rod arranged to indicate on said scale the quantity of liquid dispensed, and means for introducing air pressure into said measuring jar to superinduce discharge of the liquid from said measuring jar, for the purpose described.

7. In liquid dispensing apparatus of the character designated, in combination, a measuring jar, means for supplying liquid thereto, a vertically adjustable discharge pipe projecting into said measuring jar and provided with a valve at its upper extremity, a vertically-adjustable setter rod, a bracket arm attached to said discharge pipe and to said setter rod, said setter rod mounted by means which adapt it to be turned axially, a crank arm on the upper end of said setter rod, a rod pivotally connected to said crank arm and to the stem of said valve on the discharge pipe, a discharge hose coupling, a flexible connection between said valve and said discharge hose coupling, means for adjusting said coupling vertically, a discharge hose attached to said coupling, means in conjunction with said setter rod for positioning said discharge pipe at prescribed heights as related to the measuring jar, a fixed price scale positioned adjacent to said setter rod, and a pointer on said setter rod arranged to indicate on said scale the price of the quantity of liquid dispensed, a fixed measuring scale positioned adjacent to said setter rod and a pointer on said setter rod arranged to indicate on said scale the quantity of liquid dispensed, and means for introducing air pressure into said measuring jar to superinduce discharge of the liquid from said measuring jar, for the purpose described.

8. In liquid dispensing apparatus of the character designated, in combination, a measuring jar, means for supplying liquid thereto, a vertically adjustable discharge pipe projecting into said measuring jar and provided with a valve at its upper extremity, a vertically-adjustable setter rod, a bracket arm attached to said discharge pipe and to said setter rod, said setter rod mounted by means which adapt it to be turned axially, a crank arm on the upper end of said setter rod, a rod pivotally connected to said crank arm and to the stem of said valve on the discharge pipe, a discharge hose coupling, a fixed notched rack adjacent and parallel to the lower portion of said setter rod, and a handle on the latter the shank of which handle is adapted to fit in the notches in said rack, a flexible connection between said valve and said discharge hose coupling and means for adjusting said coupling vertically, a discharge hose attached to said coupling, and means for introducing air pressure into said measuring jar to superinduce discharge of the liquid therefrom, for the purpose described.

9. In liquid dispensing apparatus of the character designated, in combination, a measuring jar, means for supplying liquid thereto, a discharge pipe projecting into said measuring jar, a discharge hose coupling, a flexible connection between said pipe and coupling, means for raising and lowering said discharge hose coupling, a discharge hose connected with said coupling, means for raising and lowering said jar discharge pipe, and a hood vertically adjustable as related to said measuring jar and superposed parts, for the purpose described.

10. In liquid dispensing apparatus of the character designated, in combination, a measuring jar, means for supplying liquid thereto, a discharge pipe projecting into said measuring jar, a discharge hose coupling, a flexible connection between said pipe and coupling, means for raising and lowering said discharge hose coupling, a discharge hose connected with said coupling, means for raising and lowering said jar discharge pipe, and a hood vertically adjustable as related to said measuring jar and superposed parts, said hood consisting of a dome section and a telescopic lower section, for the purpose described.

11. In liquid dispensing apparatus of the character designated, in combination, a measuring jar, means for supplying liquid thereto, a discharge pipe projecting into said measuring jar, a discharge hose coupling, a flexible connection between said pipe and coupling, means for raising and lowering said discharge hose coupling, a discharge hose connected with said coupling, means for raising and lowering said jar discharge pipe, a hood vertically adjustable as related to said measuring jar and superposed parts, a rod on the upper end of which said hood is mounted, a handle on the lower portion of said rod, and fixed rests adapted to support said handle and rod at prescribed elevations, for the purpose described.

12. In liquid dispensing apparatus of the character designated, in combination, a measuring jar, means for supplying liquid thereto, a discharge pipe projecting into said measuring jar, a discharge hose coupling, a flexible connection between said pipe and coupling, means for raising and lowering said discharge hose coupling, a discharge hose connected with said coupling, means for raising and lowering said jar discharge pipe, a hood vertically adjustable as related to said measuring jar and superposed parts, a rod on the upper end of which said hood is mounted, a handle on the lower portion of said rod, and a fixed rest adapted to support said rod and handle in elevated position, for the purpose described.

13. In liquid dispensing apparatus of the character designated, in combination, two measuring jars arranged in horizontal alinement, means for supplying liquid thereto, a discharge pipe for each measuring jar projecting thereinto, a valve on each discharge pipe, a common discharge T, flexible connections between said valves and said common discharge T, a discharge hose attached to said discharge T, means for effecting the vertical adjustment of said common T, means for independently adjusting the height of said discharge pipes as related to their measuring jars, and means for introducing air pressure alternately into said measuring jars to superinduce discharge of liquid therefrom, for the purpose described.

14. In liquid dispensing apparatus of the character designated, in combination, two measuring jars arranged in horizontal alinement, means for supplying liquid thereto, a discharge pipe for each measuring jar projecting thereinto, a valve on each discharge pipe, a common discharge T, flexible connections between said valves and said common discharge T, a discharge hose attached to said discharge T, means for effecting the vertical adjustment of said common T, means for independently adjusting the height of said discharge pipes as related to their measuring jars, means for actuating and controlling said valves during the adjustment of the height of the discharge pipes to which they are attached, and means for introducing air pressure alternately into said measuring jars to superinduce discharge of liquid therefrom, for the purpose described.

15. In liquid dispensing apparatus of the character designated, in combination, two measuring jars arranged in horizontal alinement, means for supplying liquid thereto, a discharge pipe for each measuring jar projecting thereinto, a valve on each discharge pipe, a common discharge T, flexible connections between said valves and said common discharge T, a discharge hose attached to said T, a bracket arm attached to each measuring jar discharge pipe, an axially and vertically movable setter rod connected with said bracket arm, a crank attached to the upper end of said setter rod, a rod pivotally and operatively connecting said crank with the valve on the discharge pipe, means for adjusting said setter rod vertically and partially turning it on its axis, and means for introducing air pressure alternately into said measuring jars to superinduce discharge of liquid therefrom, for the purpose described.

16. In liquid dispensing apparatus of the character designated, in combination, two measuring jars arranged in horizontal alinement, means for supplying liquid thereto, a discharge pipe for each measuring jar projecting thereinto, a valve on each discharge pipe, a common discharge T, flexible connections between said valves and said common discharge T, a discharge hose attached to said T, a bracket arm attached to each measuring jar discharge pipe, an axially and vertically movable setter rod connected with said bracket arm, a crank attached to the upper end of said setter rod, a rod pivotally and operatively connecting said crank with the valve on the discharge pipe, means for adjusting said setter rod vertically and partially turning it on its axis, a fixed price scale positioned between the lower portions of the setter rods, pointers on the latter arranged to indicate the price of the liquid measured, and means for introducing air pressure alternately to said measuring jars to superinduce discharge of liquid therefrom, for the purpose described.

17. In liquid dispensing apparatus of the character designated, in combination, two measuring jars arranged in horizontal alinement, means for supplying liquid thereto, a discharge pipe for each measuring jar projecting thereinto, a valve on each discharge pipe, a common discharge T, flexible connections between said valves and said common discharge T, a discharge hose attached to said T, a bracket arm attached to each measuring jar discharge pipe, an axially and vertically movable setter rod connected with said bracket arm, a crank attached to the upper end of said setter rod, a rod pivotally and operatively connecting said crank with the valve on the discharge pipe, means for adjusting said setter rod vertically and partially turning it on its axis, fixed measuring scales adjunctive to the measuring jars, pointers on the setter rods acting in conjunction with said measuring scales, and means for introducing air pressure alternately to said measuring jars to superinduce discharge of liquid therefrom, for the purpose described.

18. In liquid dispensing apparatus of the character designated, in combination, two measuring jars arranged in horizontal alinement, means for supplying liquid thereto, a discharge pipe for each measuring jar projecting thereinto, a valve on each discharge pipe, a common discharge T, flexible connections between said valves and said common discharge T, a discharge hose attached to said T, a bracket arm attached to each measuring jar discharge pipe, an axially and vertically movable setter rod connected with said bracket arm, a crank attached to the upper end of said setter rod, a rod pivotally and operatively connecting said crank with the valve on the discharge pipe, means for adjusting said setter rod vertically and partially turning it on its axis, fixed measuring scales adjunctive to the measuring jars, pointers on the setter rods acting in conjunction with said measuring scales, a price scale positioned between the lower portions of the setter rods, pointers on the latter arranged to indicate the price of the liquid measured, and means for introducing air pressure alternately to said measuring jars to superinduce discharge of liquid therefrom, for the purpose described.

19. In liquid dispensing apparatus of the character designated, in combination, two measuring jars arranged in horizontal alinement, means for supplying liquid thereto, a discharge pipe for each measuring jar projecting thereinto, a valve on each discharge pipe, a common discharge T, flexible connections between said valves and said common discharge T, a discharge hose attached to said discharge T, means for independently adjusting the height of said discharge pipes as related to their measuring jars, a vertically adjustable hood arranged to protect said measuring jars and their superposed connections, and means for introducing air pressure alternately to said measuring jars to superinduce discharge of liquid therefrom, for the purpose described.

20. In liquid dispensing apparatus of the character designated, in combination, two measuring jars arranged in horizontal alinement, means for supplying liquid thereto, a discharge pipe for each measuring jar projecting thereinto, a valve on each discharge pipe, a common discharge T, flexible connections between said valves and said common discharge T, a discharge hose attached to said discharge T, means for independently adjusting the height of said discharge pipes as related to their measuring jars, a vertically adjustable hood arranged to protect said measuring jars and their superposed connections, said hood consisting of a dome section and of a telescopic section, and means for introducing air pressure alternately to said measuring jars to superinduce discharge of liquid therefrom, for the purpose described.

21. In liquid dispensing apparatus of the character designated, in combination, a main supply pipe, a discharge pipe, a two way valve, two measuring jars arranged in horizontal alinement, means for supplying liquid alternately thereto consisting of individual leaders connected with said two way valve, the latter being interposed between said leaders and the main supply pipe, a common drain valve, a main air pressure supply valve, drain pipes connected with said leaders and with said common drain valve and discharge pipe, a common discharge T, a discharge pipe for each of said measuring jars projecting thereinto, and connected with said common discharge T, discharge hose attached to the latter, and means for introducing air pressure alternately into said measuring jars to superinduce discharge of liquid therefrom, for the purpose described.

22. In liquid dispensing apparatus of the character designated, in combination, a two-way valve, a main liquid supply pipe, a main air pressure supply pipe, two measuring jars arranged in horizontal alinement, means for supplying liquid alternately thereto, consisting of individual leaders connected with said two way valve, said two-way valve being interposed between said leaders and the main liquid supply pipe, branch air pressure pipes connected with said leaders, a common discharge T, a two way valve interposed between said leaders and the said main air pressure supply pipe, a discharge pipe for each of said measuring jars projecting thereinto, and connected with said common discharge T, and discharge hose attached to the latter, for the purpose described.

ELMER ELSWORTH ALLEN.

Witnesses:
ROBT. CUMMINGS,
GEO. WM. MIATT.